United States Patent
Koschinat (10) Patent No.: US 8,226,099 B2
(45) Date of Patent: Jul. 24, 2012

(54) CONNECTION SYSTEM FOR CONNECTING A SUPPORTING ARM TO AN AXLE BODY

(75) Inventor: Hubert B. Koschinat, Hösbach (DE)

(73) Assignee: SAF-Holland GmbH, Bessenbach (DE)

( * ) Notice: Subject to any disclaimer, the term of this patent is extended or adjusted under 35 U.S.C. 154(b) by 184 days.

(21) Appl. No.: 12/445,646

(22) PCT Filed: Sep. 20, 2007

(86) PCT No.: PCT/EP2007/008213
§ 371 (c)(1),
(2), (4) Date: May 27, 2010

(87) PCT Pub. No.: WO2008/046488
PCT Pub. Date: Apr. 24, 2008

(65) Prior Publication Data
US 2010/0247231 A1    Sep. 30, 2010

(30) Foreign Application Priority Data
Oct. 19, 2006    (GB) .................. 10 2006 049 390

(51) Int. Cl.
*B60G 9/02*    (2006.01)

(52) U.S. Cl. ........ 280/124.116; 301/124.1; 280/124.175

(58) Field of Classification Search .............. 280/124.1, 280/124.116, 124.156, 124.175; 301/124.1; 301/134, 135, 137
See application file for complete search history.

(56) References Cited

U.S. PATENT DOCUMENTS

| 3,773,347 A | * | 11/1973 | Traylor ................ 280/124.116 |
| 4,497,504 A | | 2/1985 | Duff |
| RE32,774 E | * | 11/1988 | Duff ........................ 280/86.751 |
| 6,241,266 B1 | | 6/2001 | Smith et al. |
| 7,954,833 B1 | * | 6/2011 | Heath et al. ............ 280/124.116 |
| 2001/0017451 A1 | * | 8/2001 | Smith et al. ............ 280/124.116 |
| 2005/0253351 A1 | * | 11/2005 | Pan et al. ................ 280/124.116 |
| 2006/0237940 A1 | * | 10/2006 | Raidel et al. ........... 280/124.116 |

FOREIGN PATENT DOCUMENTS

| DE | 19946802 A1 | 4/2001 |
| EP | 1334848 A1 | 8/2003 |
| EP | 1508459 A1 | 2/2005 |
| EP | 1671821 A1 | 6/2006 |
| WO | 9817487 A1 | 4/1998 |

OTHER PUBLICATIONS

International Bureau of WIPO, "Notification Concerning Submission or Transmittal of Priority Document," dated Jan. 16, 2008, for PCT Application No. PCT/EP2007/008213 (1 Page).
German Patent Office, "International Search Report," dated Apr. 10, 2008, for PCT Application No. PCT/EP2007/008213 (11 pages).

* cited by examiner

*Primary Examiner* — Joseph Rocca
(74) *Attorney, Agent, or Firm* — Price Heneveld LLP (57) ABSTRACT

A connection system for connecting a supporting arm to an axle body comprises a first and a second supporting element each having a reinforced region, wherein the first and second supporting elements cooperate to substantially enclose the axle body, and wherein contact regions created between the first and second supporting elements are substantially vertically aligned.

16 Claims, 4 Drawing Sheets

CONNECTION SYSTEM FOR CONNECTING A SUPPORTING ARM TO AN AXLE BODY

BACKGROUND OF THE INVENTION

The present invention concerns a connection system for connecting a supporting arm to an axle body, and a vehicle axle system, particularly for a utility vehicle, such as heavy duty trucks.

Connection systems for connecting a supporting arm to an axle body are known, for example, from DE 199 46 802 A1. These connection systems typically consist of an upper half shell with shaped leveling pieces and a lower half shell without shaped leveling pieces for each side of the vehicle that are welded to the axle body at the rear, looking in the driving direction, and that extend about the axle body in such a way that the contact sites between the upper and lower half shell are situated essentially horizontal. In the region of the upper half shell, a radius arm lies with positive locking on the shaped leveling pieces and is tensioned by means of an appropriately adapted clamping plate, as well as a U-bolt extending around the axle body.

The problem with such connection systems for connecting a supporting arm to an axle body is that, owing to the design, there is a danger of the creation of indentations of the axle body underneath the half shell and a frictional corrosion of the axle tube due to a relative movement between axle tube and half shell.

Thus, the problem of the present invention is to provide a connection system for connecting a supporting arm to an axle body, especially for a utility vehicle, as well as a vehicle axle system, likewise especially for a utility vehicle, in which the load-induced pulsating indentations of the axle tube are reduced and at the same time a frictional corrosion of the axle tube is prevented.

SUMMARY OF THE INVENTION

According to the invention, a connection system is provided for connecting a supporting arm to an axle body, especially for a utility vehicle, comprising at least a first and a second supporting element, each having a reinforced region, while the first and second supporting element can be arranged on the axle body in such a way that they essentially enclose the axle body and the contact regions between the first and second supporting element are arranged in an essentially vertical manner. The reinforced regions are preferably designed as bearings for the supporting arm, so that the connection between supporting arm and axle body is such that the force exerted by the supporting arm is transmitted onto the reinforced regions of the first and second supporting element, which in turn transmit the force over a large area on the axle body. The force transmission from the first and second supporting element onto the axle body occurs advantageously with a slight surface pressure, since the first and second supporting elements make contact with the axle body on a large area, preferably essentially over its entire circumference. Advantageously, the first and second supporting elements can be arranged on the axle body such that the contact regions between the first and second supporting element are arranged essentially vertically. The contact regions between the first and second supporting element can be arranged so that they are arranged essentially parallel to the direction of force or load of the connection system (i.e., the force exerted on the connection system). The supporting elements in the installed condition preferably essentially extend vertically. Consequently, the first and second supporting element are designed such that, in the installed condition, they are arranged in front of and behind the axle body, looking in the driving direction. Therefore, the supporting elements or shaped leveling pieces can be configured such that they not only form the bearing surfaces for the supporting arm or link arm, but also have the requisite stress moment at the vulnerable place above the axle tube. The material of the supporting elements thus extends essentially vertically and advisedly forms with its reinforced regions or thickenings, preferably pointing forward and backward, a kind of bridge, which absorbs the local loads caused by the deflections of the link arm, without significantly indenting the axle tube or axle body lying underneath. Further, relative movements between the support elements and the axle body and thus an unwanted frictional corrosion are prevented. This absorption is necessary because supporting arms when placed under load, such as vehicle springs or radius arms, and in particular those of pneumatically cushioned systems, bend within the axle clamping parts, especially in the apex region or the middle of the axle body. In the present inventive configuration, the chances of indentation of the axle member are reduced, as the supporting arm with its material thickness and thus its high stress moment presses against the relatively thin axle body. This occurs in a pulsating manner with each alternating load, such as when driving on a curve. As a result, relative movements likewise occur between the axle body and the supporting element or the elements lying in between, which can lead to frictional corrosion. This problem is forestalled in the connection system according to the invention, since the first and second supporting element is configured to absorb the local loads, particularly those caused by deflections of the supporting arm, without substantially indenting the axle body lying underneath.

Advantageously, the contact regions between first and second supporting element are preferably arranged in a region or angular range of about 40° about the perpendicular or vertical axis of symmetry, more preferably about 25°, and most preferably about 10°. In other words, the contact regions preferably lie in an angular range extending from +40° to −40°, more preferably +/−25°, most preferably +/−10° in relation to the vertical axis of symmetry of the axle body in a cross section seen essentially perpendicular to the lengthwise dimension of the axle body.

Preferably, the reinforcement regions of the first and second supporting element are configured as an enlargement of the cross-sectional surface. In other words, the reinforcement regions are configured such that the wall or enclosure of the supporting elements is reinforced or thickened in this region. Consequently, a material reinforcement is provided in the region of the reinforced regions. When the first and second supporting elements are configured as a half shell, the supporting element in the region of the reinforced regions essentially bulges outward. Preferably, the wall thickness of the supporting element in the reinforced region is basically at least twice, and more preferably at least essentially four times, as thick as in the other regions.

In one embodiment, the cross-sectional surface of the reinforced regions has an essentially trapezoidal configuration, whose tapering region is preferably directed outward. Consequently, the reinforced wall region has a tapering or trapezoidal configuration in a cross section lying essentially perpendicular to the lengthwise dimension of the axle body. Advantageously, the tapering region is oriented outward or away from the axle body and facing the supporting arm.

In another embodiment, the cross-sectional surface of the reinforced regions has an essentially triangular configuration, whose tapering region is preferably facing outward. Consequently, the reinforced wall region in a cross section essentially lying perpendicular to the lengthwise dimension of the axle body has a tapering configuration or one that essentially narrows to an end point. Advantageously, the tapering region is oriented outward or away from the axle body and facing the supporting arm.

Preferably, the first and second supporting elements have an essentially curved inner surface configuration, which is configured essentially complementary or shape-complementary to an essentially curved outer surface configuration of the axle body. In other words, the first and second supporting element are configured such in their inner surface that they can at least partly enter into essentially a positive locking with the outer surface of the axle body.

Preferably the first and second supporting elements are configured separately. In other words, the first and second supporting elements are separate elements from each other, so that they can be configured from multiple parts, preferably two parts.

Alternatively, the first and second supporting elements are configured as single parts or single pieces, preferably in the form of an essentially cylindrical pipe. In other words, the first and second supporting elements are formed by a single one-part or one-piece tubular element. This can be, e.g., a one-part metal plate rolled up into a tube (like a wrap), which is reinforced to heighten the stress moment for the bearing of the supporting arm.

In another preferred embodiment, at least one of the supporting elements has a positioning or installation means, which is designed to engage with the supporting arm in positive and/or negative locking. Thus, a fastening means is provided, by means of which at least one of the supporting elements can be positioned in relation to the axle body and/or the supporting arm. This fastening means can alternatively or additionally be configured likewise as an installation or locking or holding means, which prevents a relative movement of the supporting element in relation to the axle body. The fastening means can be configured as a single part or single piece with the at least one supporting element or as a separate element.

The positioning or installation means is configured as a projection, which is designed to engage in a preferably essentially shape-complementary recess of the supporting arm. The projection can have any desired configuration. In a preferred embodiment, the projection has one or a plurality of essentially outward standing lugs, by means of which a more precise positioning of the supporting element in relation to the supporting arm is possible.

Alternatively, the positioning or installation means is configured as a separate positioning or installation means, which is designed to engage in a preferably essentially shape-complementary recess of the supporting arm and in a preferably essentially shape-complementary recess of at least one of the supporting elements. Thus, in other words, a preferably essentially aligned recess is formed both in the supporting arm and in the supporting element. These advantageously juxtaposed or aligned recesses thus form a cavity in the assembled state, which is advantageously filled up by the positioning or installation element. The positioning or installation element can have a spherical or ball-shaped surface configuration, for example. This is especially advantageous for the transmission of large forces. Of course, the separate positioning or installation element can also have any other desired surface configuration, for example, a bolt or a pin.

According to the invention, a vehicle axle system is provided, especially for utility vehicles, comprising a supporting arm, an axle body, and a first and a second supporting element, each having a reinforced region, wherein the supporting arm lies on the axle body via the first and second supporting element and wherein the first and second supporting element are arranged on the axle body in such a way that they essentially enclose the axle body, and the contact regions between the first and second supporting element are arranged in an essentially vertical manner. Thus, the supporting arm can be configured, in particular, as a trailing link, a spring arm or a leaf spring, extending preferably in the lengthwise direction of the vehicle and intersecting the axle body essentially at right angles. Accordingly, the axle body can be configured as an essentially round tube. Of course, the axle body can also have an angular, preferably a quadrangular, configuration in its cross section. Advantageously, the first and second supporting elements are arranged on the axle body such that the contact regions between the first and second supporting element are oriented essentially vertically. In other words, the contact regions between the first and second supporting element are arranged such that they are oriented essentially parallel to the force or loading direction of the connection system (i.e., the force exerted on the connection system). In other words, the supporting elements in the installed state advantageously extend essentially vertically. Consequently, the first and second supporting element are designed—unlike in the prior art—so that in the installed state they are arranged in front of and behind the axle body, looking in the driving direction. Therefore, the supporting elements or shaped leveling pieces can be configured so that they not only form the bearing surfaces for the supporting arm or control arm, but also have the requisite stress moment at the vulnerable site above the axle tube. Thus, the material of the supporting elements extends essentially vertically and forms advisedly a kind of bridge with its advantageously forward and backward pointing reinforced regions or thickenings, which absorbs the local loads from the deflections of the control arm, without significantly indenting the axle tube or axle body. Furthermore, advantageously, relative movements between the supporting elements and the axle body and thus an unwanted frictional corrosion are prevented.

Preferably, the supporting arm lies only on the reinforced regions of the first and second supporting element or contacts the reinforced regions of the first and second supporting element. Consequently, the occurrence of peak stresses or loads is prevented at the apex or uppermost region of the axle body.

Further, at least one of the first and second supporting elements is preferably welded to the axle body underneath the contact region between supporting element and supporting arm. In addition or alternatively, the fastening can also occur via a shaped piece, which protrudes on the one hand into the axle body and on the other hand into the supporting element.

Of course, the further benefits and features of the invented connection system for connecting a supporting arm to an axle body can also be provided in the invented vehicle axle system.

Further benefits and features of the present invention will appear from the following sample embodiments, described in relation to the figures, wherein individual features of the represented embodiments can be combined to yield new embodiments.

DETAILED DESCRIPTION OF THE PREFERRED EMBODIMENT

Figure 1:
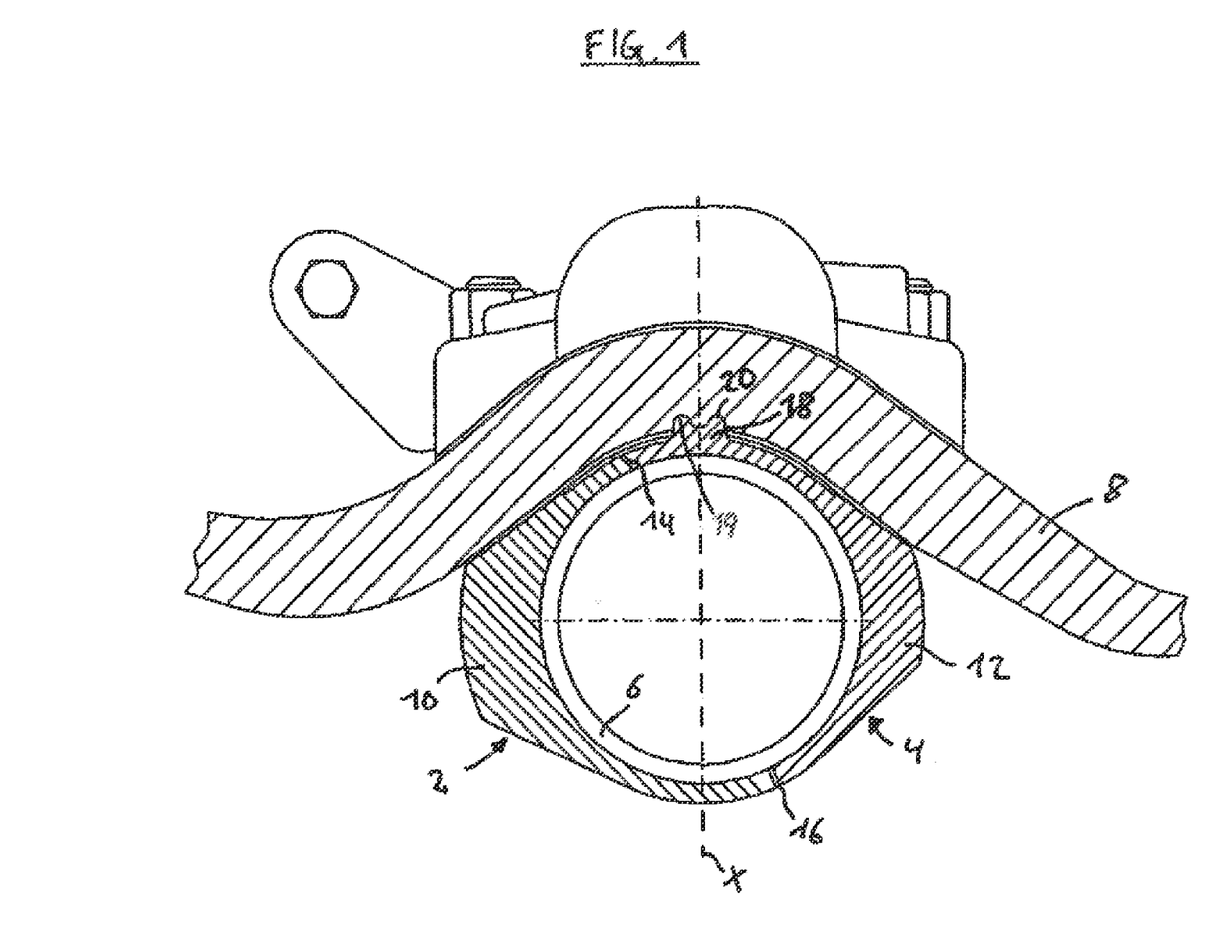
FIG. 1 is a cross-sectional view of the invented connection system or the invented vehicle axle system according to a first embodiment of the invention.

FIG. 1 shows a cross-sectional view of a first embodiment of the invented connection system or the invented vehicle axle system. The cross section here lies essentially perpendicular to the lengthwise dimension of the axle tube or axle body. The connection system comprises a first supporting element 2 and a second supporting element 4. Preferably, the first supporting element 2 is arranged in front of the second supporting element 4, looking in the driving direction. The first and second supporting element 2, 4 are arranged on the axle body 6 such that they essentially enclose the axle body 6. Finally, the invented vehicle axle system has a supporting arm 8, from which the weight of the vehicle is transmitted to the axle body 6.

The first and second supporting element 2, 4 each have a reinforced region 10, 12. The reinforced region 10, 12 is fashioned in particular in the form of an enlargement of the cross-sectional surface, i.e., a wall strengthening or thickening. In the embodiment shown in FIG. 1, the reinforced regions 10, 12 have an essentially trapezoidal configuration in their cross section lying perpendicular to the lengthwise axis of the axle body. The tapering region here is advantageously arranged so that it points outward, i.e., away from the axle body 6 and toward the supporting arm 8. In other words, the reinforced regions 10, 12 project backward and forward, looking accordingly in the lengthwise direction of the vehicle, i.e., away from the axis of the axle body 6.

The first and second supporting element 2, 4 essentially enclose the axle body. Consequently, the first and second supporting element 2, 4 basically contact each other at least partly at corresponding contact regions 14, 16. The contact regions 14, 16 between the first and second supporting element 2, 4 are arranged essentially vertically. In other words, the line of connection between the contact region 14 and the contact region 16 is basically parallel or at an angle less than around 40 degrees, preferably less than around 25 degrees and especially favorably less than around 10 degrees to a vertical axis of symmetry X. The vertical axis of symmetry X corresponds in its orientation basically to the direction of the force or load exerted by the supporting arm 8 on the axle body 6 by virtue of the weight of the (utility) vehicle. Consequently, the first and second supporting element 2, 4 extend essentially vertically, so that they are arranged essentially in front of and behind the axle body 6, looking in the driving direction.

The supporting arm 8 can be configured as a trailing link, a spring arm or a leaf spring, extending in the lengthwise direction of the vehicle and intersecting the axle body 6 essentially at right angles. The weight of the vehicle bears essentially on the supporting arm 8. This is transmitted via the first and second supporting element 2, 4 to the axle body 6. Due to the geometrical configuration of the first and second supporting element 2, 4 and in particular their vertical arrangement, the point-like load exerted by the supporting arm 8 at the contact surfaces with the first and second supporting element 2, 4 is transformed into a two-dimensional load on the axle body 6, since the first and second supporting element 2, 4 lie essentially with a surface on the axle body 6. This is given, since the curved inner surface configuration of the first and second supporting element 2, 4 is fashioned basically shape-complementary to the basically curved outer surface configuration of the axle body 6. Due to the loading, the supporting arm 8 has a tendency to be deflected. The deflection of the supporting arm 8 leads to a further point loading of the elements lying underneath. In the prior art—due to the different thickness relations of supporting element and supporting arm (stress moment of the supporting arm is around 10 times greater than that of the supporting element and axle body taken together)—this results in the supporting arm pressing on the supporting element and the axle tube lying underneath, so that the latter is too heavily loaded and can even become significantly indented as a result. Due to the configuring of the first and second supporting element 2, 4 with reinforced regions 10, 12, a load-induced indenting of the axle tube is prevented, since the peak loads caused by the deflection of the supporting arm 8 are compensated by the reinforced regions 10, 12.

In the embodiment shown, moreover, the second supporting element 4 has a positioning and installation means in the form of a projection or positioning member 18. The projection 18 extends from the second supporting element 4 basically outward in the direction of the supporting arm 8. A corresponding preferably shape-complementary recess or positioning member 19 is provided in the supporting arm 8, so that the projection 18—and with it the second support element 4—stands in positive and/or negative locking engagement with the supporting arm 8. For better positioning of the second supporting element 4, the projection 18 further has at least one lug 20. Of course, the projection 18 can likewise be configured on the first supporting element 2 or on both supporting elements 2, 4.

Figure 2:
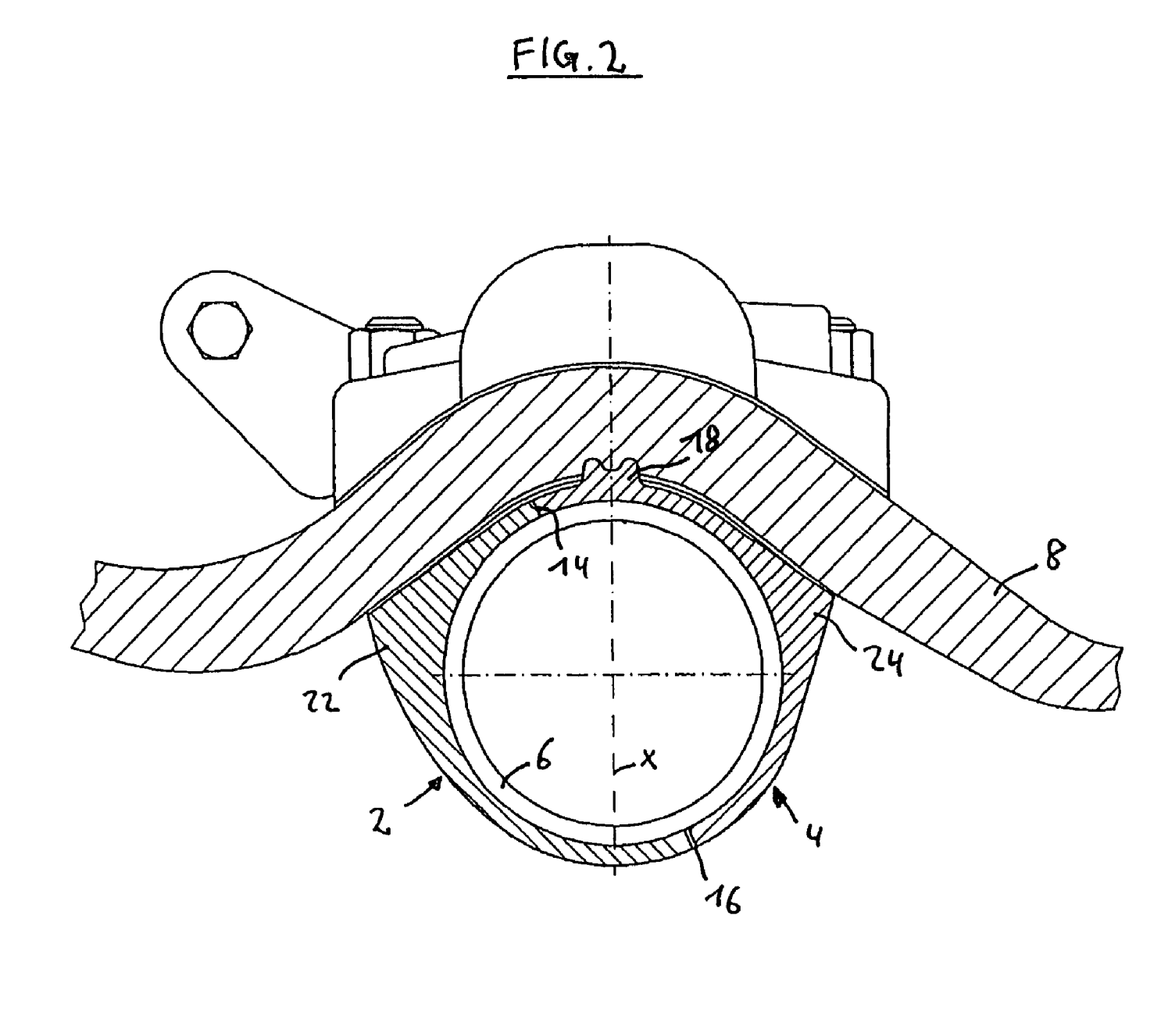
FIG. 2 is a cross-sectional view of the invented connection system or the invented vehicle axle system according to a second embodiment of the invention.

In FIG. 2, another embodiment of the invented connection system or the invented vehicle axle system is shown. This one differs in particular with regard to the geometrical configuration of the reinforced regions. In this embodiment, the first and second supporting element 2, 4 have reinforced regions 22, 24 which have an essentially triangular configuration in their cross section, which lies essentially perpendicular to the lengthwise direction of the axle body 6. The tapering region of the reinforced region 22, 24 is preferably oriented outward. Consequently, the tapering region of the reinforced regions 22, 24 extends away from the axle body 6 and advantageously faces the supporting arm 8.

Figure 3:
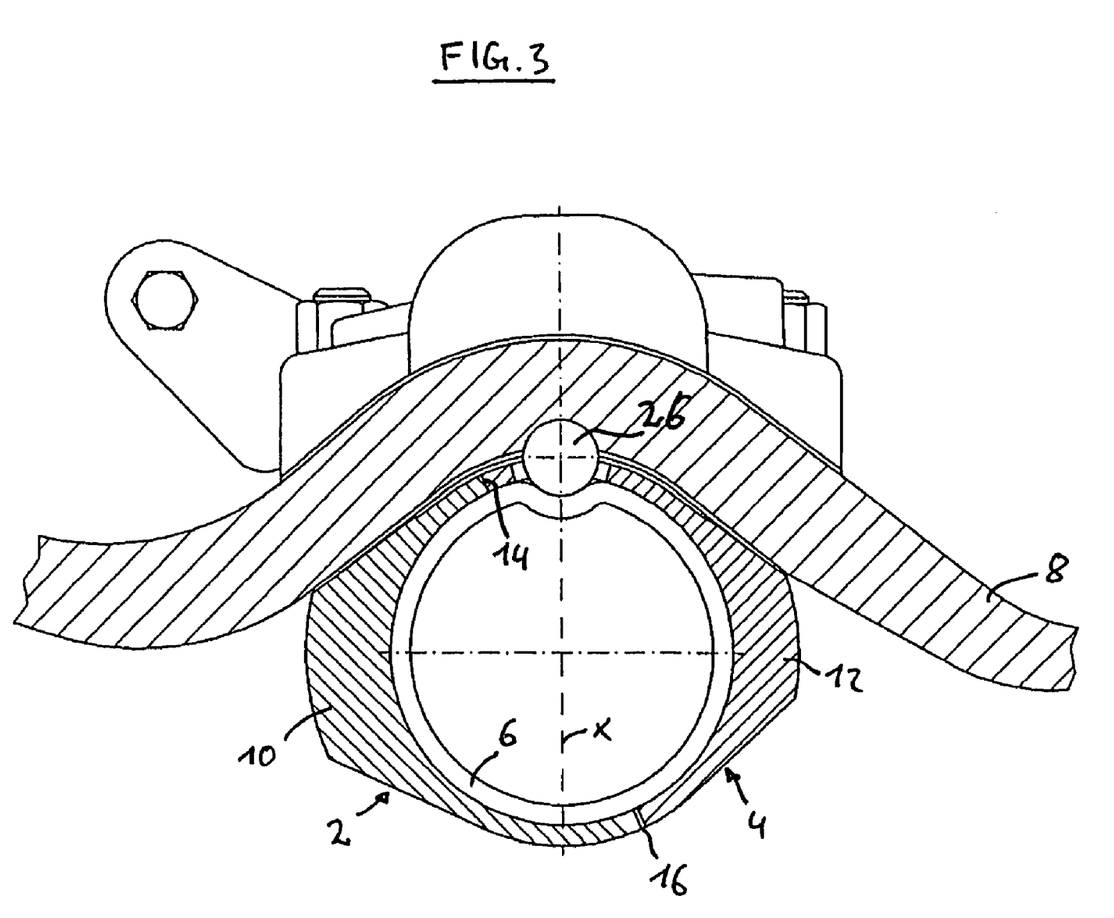
FIG. 3 is a cross-sectional view of the invented connection system or the invented vehicle axle system according to a third embodiment of the invention.

FIG. 3 shows another embodiment. This one has a separate positioning and installation element 26 as the positioning and installation means. The positioning and installation element 26 engages in a recess of the supporting arm 8 and in a recess provided in at least one of the supporting elements 2, 4. The positioning and installation element 26 advantageously has a ball-shaped or spherical surface configuration. However, it can also have any other desired geometrical configuration, such as a pin or a bolt. This assures an especially advantageous fixing of the position of the first and second supporting element 2, 4.

Figure 4A:
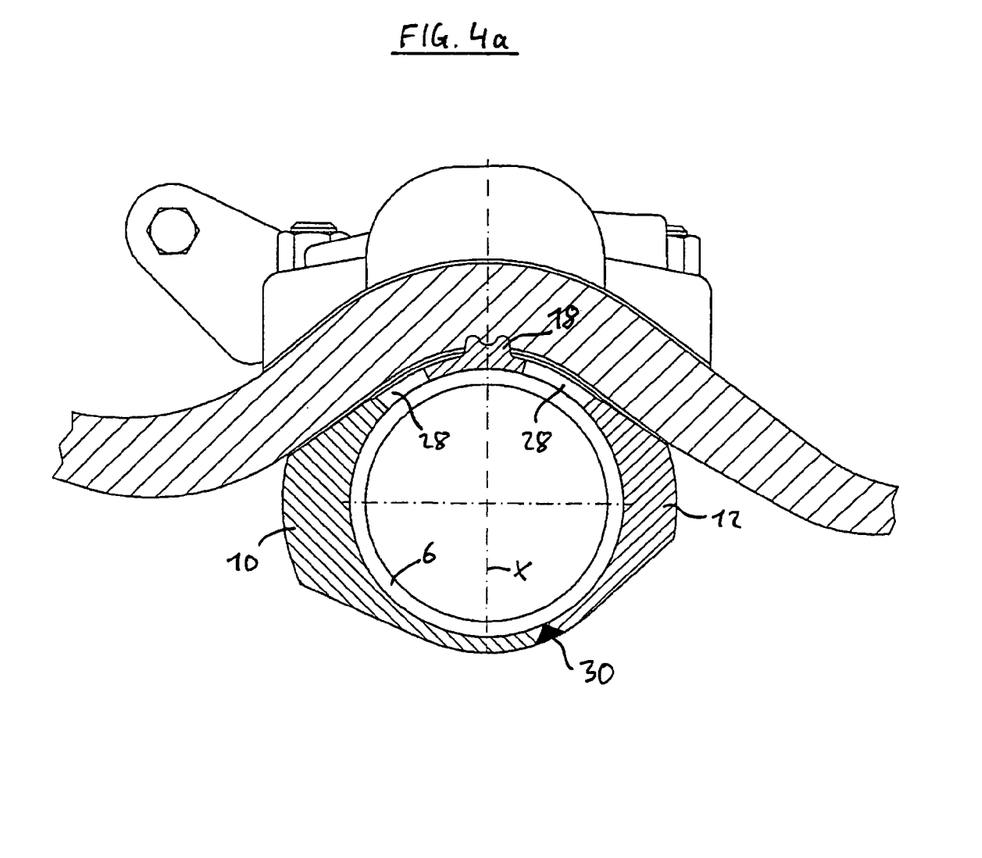
FIG. 4a is a cross-sectional view of the invented connection system or the invented vehicle axle system according to a fourth embodiment of the invention.
Figure 4B:
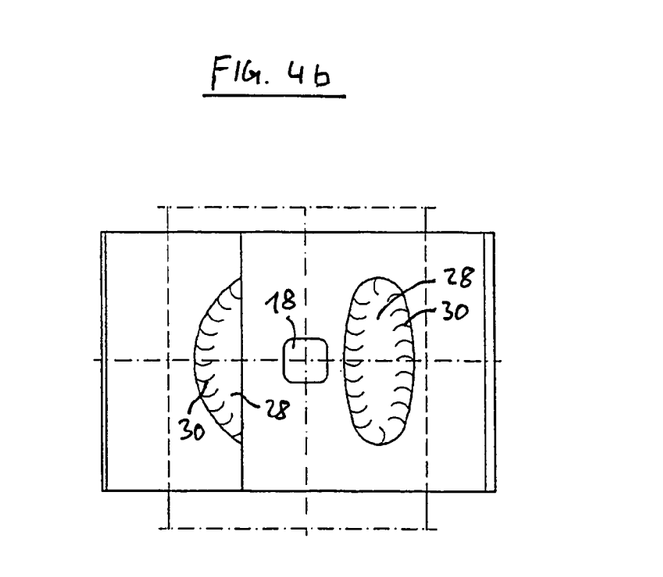
FIG. 4b is a top view of the invented connection system according to the fourth embodiment of the invention.

Finally, another embodiment is shown in FIGS. 4a and 4b. The connection system here is configured such that the first and second supporting element 2, 4 are configured as a single part or single piece. In other words, the first and second supporting element 2, 4 is configured as a single, one-piece element. This can have, for example, the shape of an essentially cylindrical tube, which is created by a rolled-up metal sheet (like a wrap). This has corresponding recesses 28, by which a connection can be produced with the axle body 6 by means of a welded seam 30.

The invention claimed is:

1. A connection system for an axle body to a supporting arm, comprising:
   an axle body;
   a first supporting element having a reinforced region comprised of an enlarged area, a first end wherein the first supporting element extends about the axle body; and
   a second supporting element having a reinforced region comprised of an enlarged area, a first end and a second end, wherein the second supporting element extends about an axle body and cooperates with the first supporting element to substantially enclose an axle body, the first end of the first supporting element abuts the first end of the second supporting element to create a first contact region, the second end of the first supporting element abuts the second end of the second supporting element to create a second contact region, wherein the first and second contact regions are substantially vertically aligned with one another, and wherein at least one of the reinforced region of the first supporting element and the reinforced region of the second supporting element abut an underside of a supporting arm.

2. The connection system of claim 1, wherein the enlarged area of the first and second supporting elements each comprises a triangularly-shaped configuration having an outwardly-extending tapered region.

3. The connection system of claim 1, wherein the axle body includes a curved outer surface, and wherein the first and second supporting elements each include a curved inner surface that is substantially complimentary to the curved outer surface of the axle body.

4. The connection system of claim 1, wherein the first and second supporting elements are formed of separate pieces.

5. The connection system of claim 4, wherein the first and second supporting elements cooperate to form a cylinder.

6. The connection system of claim 1, further including:
   a supporting arm supported by the first and second supporting elements; and
   an alignment member separate from the supporting arm and that engages the supporting arm and at least a select one of the first supporting element and the second supporting element, thereby aligning the supporting arm with the axle body.

7. The connection system of claim 1, wherein at least a select one of the first and second supporting elements is weldably secured to the axle body.

8. A connection system for an axle body to a supporting arm, comprising:
   an axle body;
   a first supporting element having a reinforced region, a first end and a second end, wherein the first supporting element extends about the axle body; and
   a second supporting element having a reinforced region, first end and a second end, wherein the second supporting element extends about an axle body and cooperates with the first supporting element to substantially enclose an axle body, the first end of the first supporting element abuts the first end of the second supporting element to create a first contact region, the second end of the first supporting element abuts the second end of the second supporting element to create a second contact region, and wherein the first and second contact regions substantially vertically aligned with one another, wherein the reinforced region of the first supporting element and the reinforced region of the second supporting region each comprise an enlarged area of a cross section of the first supporting element and the second supporting element, respectively.

9. A connection system for an axle body to a supporting arm, comprising:
   an axle body;
   a first supporting element having a reinforced region, a first end and a second end, wherein the first supporting element extends about the axle body; and
   a second supporting element having a reinforced region, first end and a second end, wherein the second supporting element extends about an axle body and cooperates with the first supporting element to substantially enclose an axle body, the first end of the first supporting element abuts the first end of the second supporting element to create a first contact region, the second end of the first supporting element abuts the second end of the second supporting element to create a second contact region, and wherein the first and second contact regions substantially vertically aligned with one another, wherein the reinforced region of the first supporting element and the reinforced region of the second supporting region each comprise an enlarged area of a cross section of the first supporting element and the second supporting element, respectively, wherein the enlarged area of the first and second supporting elements each comprises a trapezoidal configuration having an outwardly-extending tapered region.

10. A connection system for an axle body to a supporting arm, comprising:
    an axle body;
    a first supporting element having a reinforced region, a first end and a second end, wherein the first supporting element extends about the axle body;
    a second supporting element having a reinforced region, first end and a second end, wherein the second supporting element extends about an axle body and cooperates with the first supporting element to substantially enclose an axle body, the first end of the first supporting element abuts the first end of the second supporting element to create a first contact region, the second end of the first supporting element abuts the second end of the second supporting element to create a second contact region, and wherein the first and second contact regions substantially vertically aligned with one another;
    a supporting arm supported by the first and second supporting elements and including a first positioning member, and wherein at least a select one of the first supporting element and the second supporting element include a second positioning member that cooperates with the first positioning member to align the supporting arm with the axle body.

11. The connection system of claim 10, wherein the first and second positioning members cooperate for a positive lock.

12. The connection system of claim 10, wherein the first positioning member includes a recess, and wherein the second positioning member includes a projection that is received within the recess.

13. A connection system for an axle body to a supporting arm, comprising:
    an axle body;
    a first supporting element having a reinforced region, a first end and a second end, wherein the first supporting element extends about the axle body;
    a second supporting element having a reinforced region, first end and a second end, wherein the second supporting element extends about an axle body and cooperates with the first supporting element to substantially enclose an axle body, the first end of the first supporting element abuts the first end of the second supporting element to create a first contact region, the second end of the first supporting element abuts the second end of the second supporting element to create a second contact region, and wherein the first and second contact regions substantially vertically aligned with one another;

a supporting arm supported by the first and second supporting elements, and wherein a majority of a vertically directed force exerted from the supporting arm to the first and second supporting elements is supported by the reinforced regions.

14. A connection system for an axle body to a supporting arm, comprising:
   an axle body;
   a first supporting element having a reinforced region comprised of an enlarged area, a first end and a second end, wherein the first supporting element extends about the axle body; and
   a second supporting element having a reinforced region comprised of an enlarged area, a first end and a second end, wherein the second supporting element extends about an axle body and cooperates with the first supporting element to substantially enclose an axle body, the first end of the first supporting element abuts the first end of the second supporting element to create a first contact region, the second end of the first supporting element abuts the second end of the second supporting element to create a second contact region, wherein the first and second contact regions are within the range of about 40° alignment with a vertical axis, and wherein at least one of the reinforcement region of the first supporting element and the reinforcement region of the second supporting element abut an underside of a supporting arm.

15. The connection system of claim 14, wherein the first and second contact regions are with the range of 25° alignment with the vertical axis.

16. The connection system of claim 15, wherein the first and second contact regions are with the range of 10° alignment with the vertical axis.

* * * * *

UNITED STATES PATENT AND TRADEMARK OFFICE
CERTIFICATE OF CORRECTION

PATENT NO. : 8,226,099 B2
APPLICATION NO. : 12/445646
DATED : July 24, 2012
INVENTOR(S) : Hubert B. Koschinat Page 1 of 2

It is certified that error appears in the above-identified patent and that said Letters Patent is hereby corrected as shown below:

In the Specification

Column 1
Line 17, "shell" should be -- shells --
Lines 51, 54, 60, 62, 67, "element" should be -- elements --

Column 2
Line 30, "element is" should be -- elements are --
Line 35, "element" should be -- elements --
Line 45, "element" should be -- elements --

Column 3
Line 12, "element" should be -- elements --

Column 4
Lines 3, 4, 6, 16-17, 18-19, 24, "element is" should be -- elements are --
Lines 41, 42-43, "element" should be -- elements --

Column 5
Lines 21, 26, 39, 41, 43-44, 53, 62, 64, 66, "element" should be -- elements --

Column 6
Lines 1, 4, 17, 39, 57, 60, 62, "element" should be -- elements --

In the Claims

Column 7
Line 65, "aligned" should be -- align --
Line 67, "region" should be -- element --

Signed and Sealed this
First Day of October, 2013

Teresa Stanek Rea
*Deputy Director of the United States Patent and Trademark Office*

CERTIFICATE OF CORRECTION (continued)
U.S. Pat. No. 8,226,099 B2

In the Claims

Column 8
Line 20, "aligned" should be -- align --
Line 22, "region" should be -- element --
Line 45, "aligned" should be -- align --
Line 49, "include" should be -- includes --

Column 9
Line 9, "aligned" should be -- align --

Column 10
Line 15, "with" should be -- within --
Line 18, "with" should be -- within --